(12) United States Patent
Pillar et al.

(10) Patent No.: US 10,379,899 B2
(45) Date of Patent: Aug. 13, 2019

(54) SYSTEMS AND METHODS FOR FRAME PRESENTATION AND MODIFICATION IN A NETWORKING ENVIRONMENT

(71) Applicant: FREESCALE SEMICONDUCTOR, INC., Austin, TX (US)

(72) Inventors: John F. Pillar, Ottawa-Ontario (CA); Michael Kardonik, Austin, TX (US); Bernard Marchand, Cantley (CA); Peter W. Newton, Austin, TX (US); Mark A. Schellhorn, Ottawa (CA)

(73) Assignee: NXP USA, Inc., Austin, TX (US)

( * ) Notice: Subject to any disclaimer, the term of this patent is extended or adjusted under 35 U.S.C. 154(b) by 434 days.

(21) Appl. No.: 14/944,350

(22) Filed: Nov. 18, 2015

(65) Prior Publication Data

US 2017/0139744 A1    May 18, 2017

(51) Int. Cl.
*G06F 9/48* (2006.01)
*G06F 3/06* (2006.01)

(52) U.S. Cl.
CPC .......... *G06F 9/4881* (2013.01); *G06F 3/0604* (2013.01); *G06F 3/0659* (2013.01); *G06F 3/0673* (2013.01)

(58) Field of Classification Search
CPC .... G06F 3/0604; G06F 3/0659; G06F 3/0673; G06F 9/4881; G06F 12/0835; G06F 12/1081; G06F 15/17331; G06F 2213/28; G06F 2213/2802; G06F 2213/2804; G06F 2213/2806; G06F 2213/2808; H04L 45/00; H04L 69/22; H04L 29/06; H04L 45/742; H04L 49/3063; H04L 69/08; H04L 69/12; H04L 69/18; H04J 2203/0082
See application file for complete search history.

(56) References Cited

U.S. PATENT DOCUMENTS

| | | | |
|---|---|---|---|
| 6,731,644 B1 | 5/2004 | Epps et al. | |
| 6,944,168 B2 | 9/2005 | Paatela et al. | |
| 7,689,738 B1* | 3/2010 | Williams | G06F 13/34 710/52 |
| 8,284,776 B2 | 10/2012 | Petersen | |
| 9,501,436 B1* | 11/2016 | Bruce | G06F 13/28 |
| 2003/0097498 A1* | 5/2003 | Sano | H04L 49/10 710/22 |
| 2004/0030745 A1* | 2/2004 | Boucher | H04L 29/06 709/203 |
| 2004/0064589 A1* | 4/2004 | Boucher | H04L 69/16 709/250 |

(Continued)

*Primary Examiner* — Mohamed A Kamara
(74) *Attorney, Agent, or Firm* — Mary Jo Bertani

(57) ABSTRACT

A data processing system can comprise a first module having a workspace and configured to execute a task that can request access to a frame in a system memory, a queue manager configured to store a frame descriptor which identifies the frame in the system memory, and a memory access engine coupled to the first module and the queue manager. The memory access engine copies requested segments of the frame to the workspace and has a working frame unit to store a segment handle identifying a location and size of each requested segment copied to the workspace of the first module. The memory access engine tracks history of a requested segment by updating the working frame unit when the requested segment in the workspace is modified by the executing task.

20 Claims, 11 Drawing Sheets

(56) References Cited

U.S. PATENT DOCUMENTS

| | | | |
|---|---|---|---|
| 2004/0073703 A1* | 4/2004 | Boucher | H04L 69/16 709/245 |
| 2004/0078462 A1* | 4/2004 | Philbrick | H04L 29/06 709/224 |
| 2006/0146814 A1* | 7/2006 | Shah | H04L 67/1097 370/389 |
| 2014/0122634 A1* | 5/2014 | Conner | G06F 13/4027 709/212 |

* cited by examiner

SYSTEMS AND METHODS FOR FRAME PRESENTATION AND MODIFICATION IN A NETWORKING ENVIRONMENT

BACKGROUND

Field

This disclosure relates generally to multi-core processing devices, and more specifically, to systems and methods for frame presentation and modification in a networking environment.

Related Art

The complexity of integrated circuits has dramatically increased during the last decade. System-on-chip and other multiple-core integrated circuits are being developed in order to support various applications such as but not limited to multimedia applications, networking, real time applications and the like.

Modern integrated circuits are capable of executing a large number of tasks substantially in parallel. Frame manipulation for a multi-core architecture optimized for networking applications presents several challenges. The architecture must achieve very high data rates and deterministic performance along with superior performance per watt for frame processing applications with minimum to no software overhead for functions such as frame manipulation functions. The term "frame" refers to a collection of information that is communicated between adjacent network nodes, as specified for the International Organization for Standardization (ISO) Open Systems Interconnection (OSI) data link layer.

Network applications are designed to modify and make forwarding decisions for frames based on frame headers and frame content. Frames are typically stored in one of multiple formats such as single buffer, scatter gather, and frame list that do not easily support arbitrary insertion/deletion of bytes within the frame. Furthermore, the frames are usually stored in dynamic random-access memory, which has high access latency from the software point of view.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

In embodiments of systems and methods disclosed herein, a frame being processed by software in a core processor is presented as a contiguous string of bytes that is an abstract view of the underlying storage container. The abstract view is called a working frame. A portion of the working frame, defined as a frame segment, can be presented, modified, re-sized, and then committed back to the working frame with no knowledge or limitations imposed by the frame storage container. The working frame segment presentation is done in memory with relatively low access latency providing fast access to frame data to software. Multiple non-overlapping frame segments can be presented concurrently and independently, enabling networking software to be developed in a modular way and view the frame segments as objects. A frame descriptor containing a stateful representation of the working frame and the modifications applied to the working frame is maintained. One or more frame segments can be used to represent the working frame. The working frame is the sum (concatenation) of all segments in the frame. Once networking software makes a forwarding decision for the frame, the working frame can then be stored into its original storage container with some additional buffering resources added as required, or into a new container of a specified format.

Figure 1:
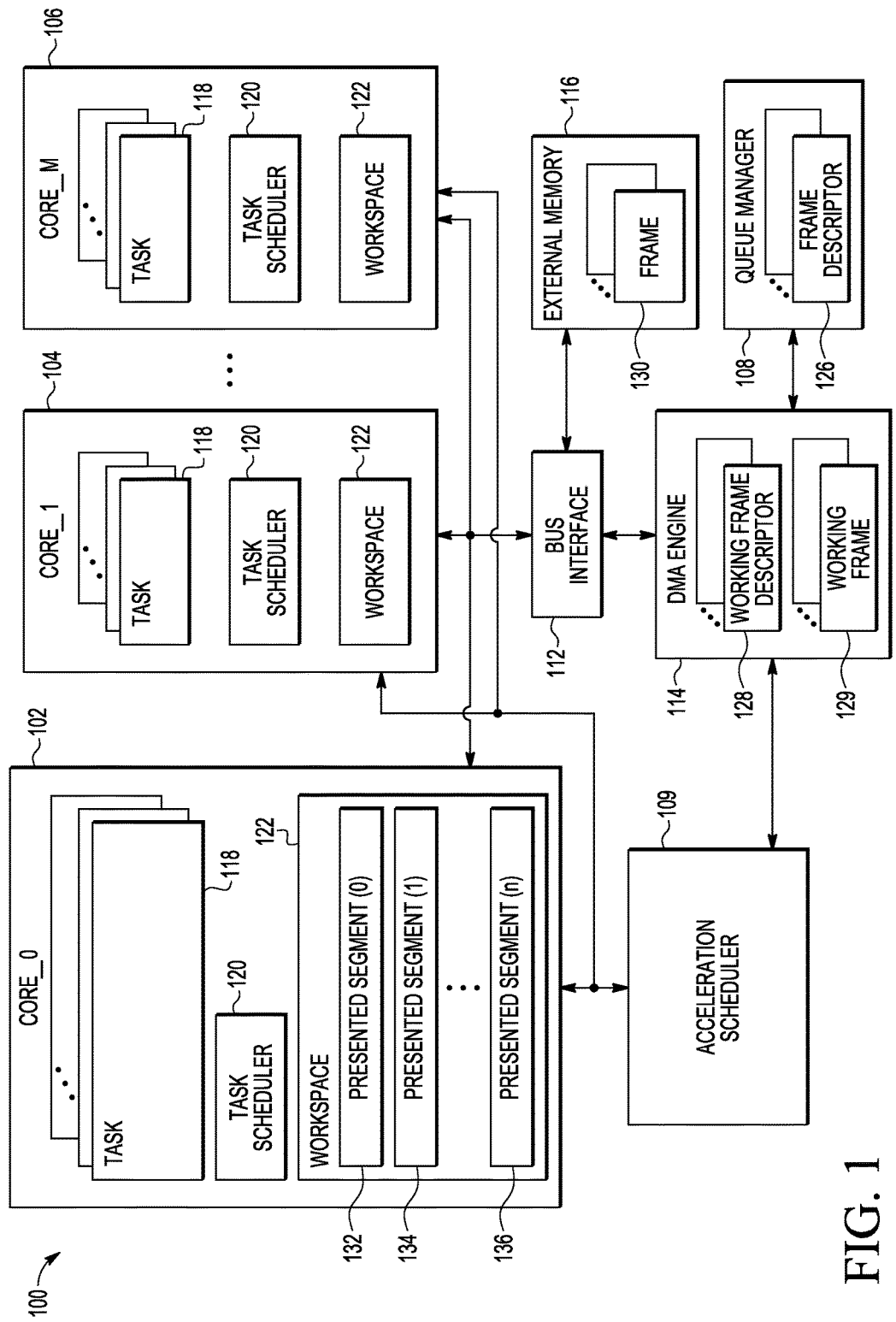
FIG. 1 is a block diagram of a multi-core processing system in accordance with an embodiment of the disclosure.

FIG. 1 is a block diagram of a multi-core processing system 100 in accordance with an embodiment of the disclosure including one or more processing cores 102, 104, 106, queue manager and acceleration scheduler 108, bus interface 112, direct memory access (DMA) engine 114 and external memory 116. Acceleration scheduler 109 is coupled to cores 102, 104, 106 and bi-directionally coupled to DMA engine 114. Queue manager 108 is bi-directionally coupled to DMA engine 114. Bus interface 112 is coupled for bi-directional communication with DMA engine 114, external memory 116, and cores 102-106.

Processing system 100 may include one, two, or any number of processing cores 102, 104, 106. If a plurality of processing cores 102-106 are used in computer processing system 100, any number of them may be the same, or different. Processing cores 102-106 can execute a plurality of instruction sets in threads, tasks and/or programs. In the example shown, processing cores 102-106 execute one or more tasks 118 that may be part of a thread. Cores 102-106 also include task scheduler 120 and workspace 122. Workspace 122 includes multiple presented memory segments 132, 134, 136 that may be allocated by a task 118 when DMA engine 114 transfers data. Memory segments 132, 134, 136 can be used to store an abstract of a frame that includes various parameters and data requested by the task 118.

Task scheduler 120 handles context switching between tasks based on priority and/or whether a task is waiting for DMA engine 114 to copy data into the task's workspace 122 or is finished consuming data from DMA engine 114. A task may be switched to inactive status when waiting for DMA data, returned to active status when the data is available, switched back to inactive when finished using the data, and then returned to ready for scheduling when the data is copied from the task's workspace 122, as required.

Tasks 118 may invoke or call memory functions to perform a DMA operation to copy data from external memory 116 to workspace 122. Acceleration scheduler 108 coupled to cores 102-106 and DMA engine 114 can coordinate usage of data between tasks 118 in multiple cores 102-106 and schedules DMA memory requests from tasks 118 within cores 102-106 according to the priority of tasks 118 and cores 102-106. Lists of tasks 118 currently using specified data, and tasks 118 waiting to use the specified data can also be maintained. As one task 118 finishes using the specified data, a next waiting task 118 can be allowed to use the data. Tasks 118 may be scheduled on a first come, first served basis, or other suitable basis.

The queue manager 108 can maintain multiple frame descriptors 126 awaiting delivery to the DMA Engine 114. Frame descriptors 126 include information specifying a set of processing steps to be performed by the DMA Engine 114 upon arrival at the DMA Engine 114. Upon delivery of a frame descriptor 126 to the DMA Engine 114, the frame descriptor becomes the basis for a working frame descriptor 128 (a single context record) within the DMA Engine 114.

Working frame descriptors 128 include information regarding where segments of data for the working frames 129 are stored. This information can include a number of bytes for the working frame, start and end address of each segment, whether the segment(s) reside in internal DMA engine 114 or external memory 116, state of the data segment(s) such as modified or deleted, and whether data associated with the frame is open in one of presented segments 132-136 in workspace 122.

The DMA Engine 114 can maintain multiple working frame descriptors 128. Each working frame descriptor 128 refers to one working frame 129. One working frame 129 is associated with one working frame descriptor 128.

Frames 130 are stored in external memory 116 as they initially arrive. DMA engine 114 includes multiple working frame descriptors 128 that are used to identify portions of memory in DMA engine 114 and/or external memory 116 that comprise a corresponding working frame 129. One or more presented segments 132-136 may be modified by a task 118 and returned to external memory 116. Some portions of a working frame 129 may be held in DMA engine 114 while other portions of the working frame 129 may be stored in a corresponding frame 130 in external memory. Working frame descriptors 126 specify the location, state, and size of each segment in a corresponding working frame 129 and allow changes to be made to frames 130 and retained in DMA engine 114 while avoiding the latency associated with repeatedly accessing external memory 116. Frame descriptors 126 are updated to reflect any changes in frame 130 when changes to frame 130 are transferred.

Bus interface 112 can include a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

External memory 116 can be implemented with one or more of various types of SDRAM or other suitable type of memory that is directly accessible by DMA engine 114. DMA engine 114 can also read/write data in workspace 122 and transfer data to and from workspace 122 in a single core as well as between cores 102-106.

Figure 2:
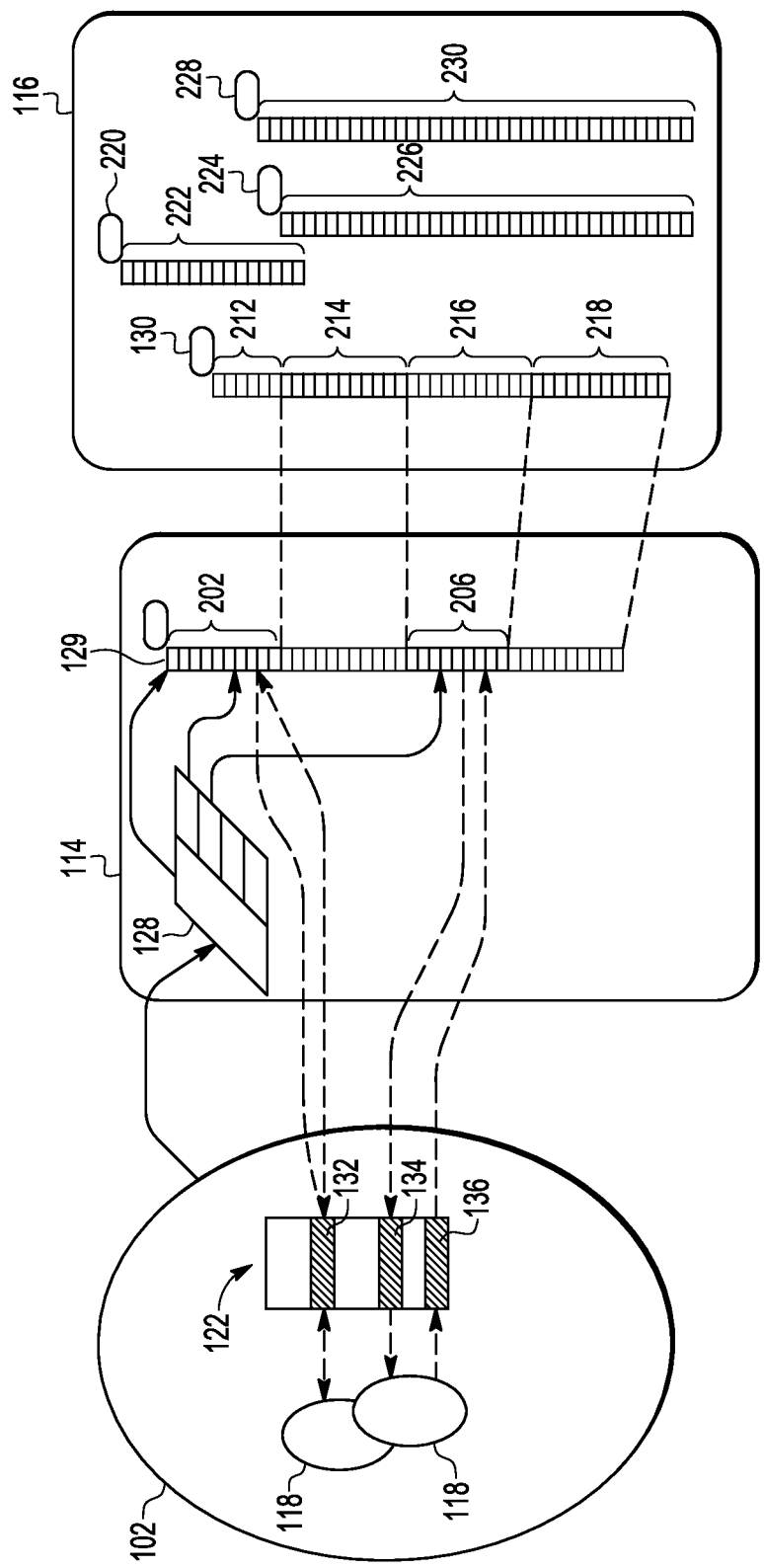
FIGS. 2-11 are diagrams of components that are used in various ways to handle frames in the multi-core processing system of FIG. 1.

FIGS. 2-11 are diagrams of components that are used in various ways to handle frames in the multi-core processing system 100 of FIG. 1. Referring to FIG. 2, relationships between components in system 100 are shown with processing core 102 including multiple tasks 118 capable of accessing presented segments 132-136 in workspace 122. Tasks 118 can access different presented segments 132-136 independently of one another, but two tasks 118 cannot access the same presented segment 132-136 simultaneously.

External memory 116 is shown with multiple frames 130, 220, 224, 228. Different frames 130, 220, 224, 228 can be used by different tasks 118 within cores 102-106 (FIG. 1) concurrently and can have different sizes and access requirements. Tasks 118 within processor cores 102-106 can define a segment of interest in a frame 130, 220, 224, 228, request presentation of the segment of interest, and then replace or remove part of the presented segment 132-136. Working frame descriptors 128 are owned or dynamically assigned to a task 118 within processor core 102-106 when a segment of interest is requested.

DMA engine 114 includes working frame descriptor(s) 128 and a corresponding working frame 129 for each frame 130 requested by a task 118. Working frame descriptors 128 includes a descriptor that specifies the corresponding working frame 129 and segment handles that point to each segment 202, 206 in the working frame 129 that was or is being presented in workspace 122 of processor core 102.

Tasks 118 can perform operations on presented segments 132-136 including defining, opening, presenting, replacing, trimming, expanding, and closing segments, as further described in the description of FIGS. 4-12. Once a task 118 within core 102 is finished operating on a presented segment 132-136, the modified presented segment 132-136 is transferred to working frame 129 to replace the corresponding unmodified segment in working frame 129 with the updated segment. Segments 202, 206 of working frame 129 that replace segments 212, 216 can remain in working frame 129 until the working frame is closed, while segments 214, 218 that remain unpresented and unchanged can remain in external memory 116. When a working frame 129 is closed, the updated segments can be transferred to the corresponding original frame 130, 220, 224, 228 in external memory 116 and the corresponding frame descriptor 126 is updated to reflect the new structure of the frame 130, 220, 224, 228.

Frames 130, 220, 224, 228 can initially include one contiguous byte string or multiple contiguous byte strings. For example, frame 130 includes four independent byte strings 212, 214, 216, 218 while frames 220, 224, 228 each contain one contiguous byte string 222, 226, 230. The size of the byte strings 212, 214, 216, 218, 222, 226, 230 can increase up to the size of the corresponding frame or buffer, or decrease, depending on changes made to the string by one or more tasks 118.

Figure 3:
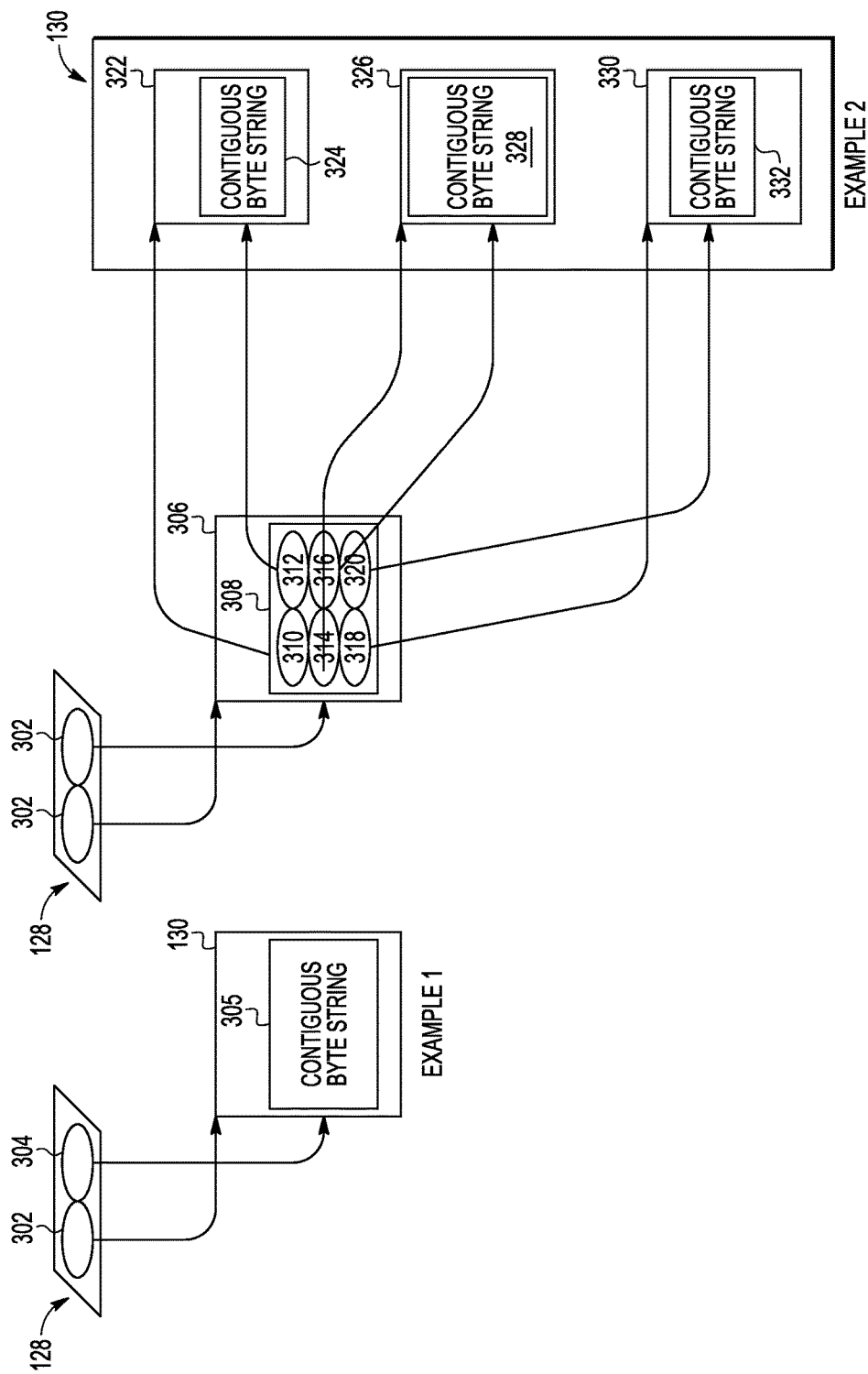

FIG. 3 shows a first example of a working frame descriptor 128 with a container descriptor 302 and string descriptor 304 that points to a frame 130 having one contiguous byte string 305. For the first example with one contiguous byte string 305, container descriptor 302 can specify either an address or a pointer, and a size of frame 130. String descriptor 304 can specify a relative position and length of the byte string in frame 130.

FIG. 3 also shows a second example of working frame descriptor 128 that points to a container 306 for a scatter-gather list 308 of container descriptors 310, 314, 318 and string descriptors 312, 316, 320 for frame 130 with multiple buffers 322, 326, 330. Container 306 can reside in external memory 116 (FIG. 1) or other suitable location. Each buffer 322, 326, 330 includes a contiguous byte string 324, 328, 332 that occupies some or all of the space in the corresponding buffer 322, 326, 330. For the second example with multiple byte strings 324, 328, 332, container descriptor 302 specifies the location or address of container 306 for scatter-gather list 308 and the size of container 306. Each container descriptor 310, 314, 318 can specify either an address or a pointer, and a size of a respective buffer 322, 326, 330 in frame 130. Each string descriptor 312, 316, 320 can specify a relative position and length of a corresponding byte string 324, 328, 332 in a respective buffer 322, 326, 330 in frame 130.

Figure 4:
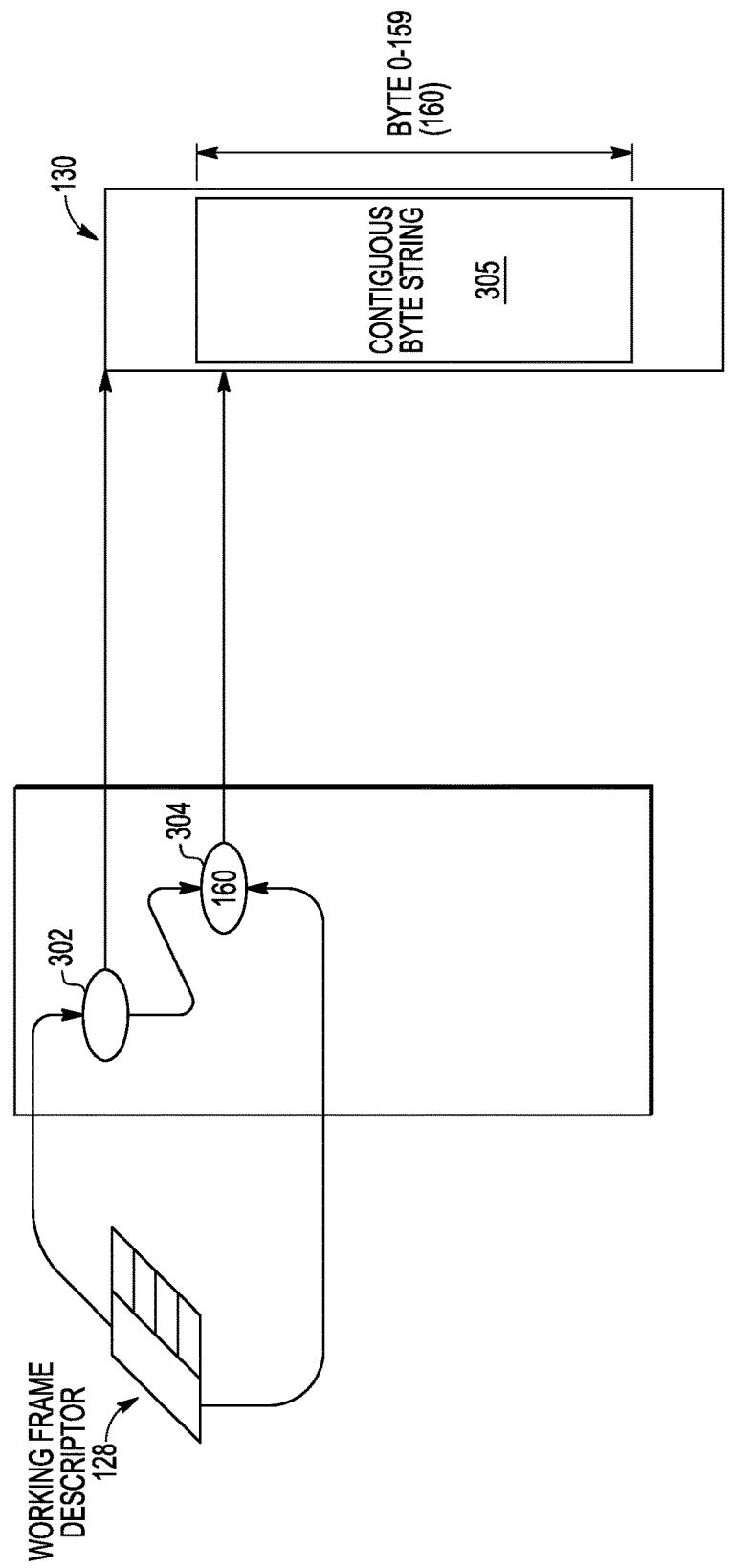

Referring now to FIGS. 1 and 4, FIG. 4 illustrates an initial state of frame 130 with a single contiguous byte string 305 and working frame descriptor 128, according to an embodiment. Frame 130 is stored in external memory 116 when frame 130 initially arrives in system 100. Tasks 118 can define can define one or more segments of interest in frame 130 and request presentation of the segments of interest by referencing working frame descriptor 128 and specifying the segment(s) of interest. DMA engine 114 keeps track of which segments are open, i.e., currently being used by another task 118, and can control access to frames 130 by waiting until the requested segment(s) of interest are available for another task 118 to use.

When DMA engine 114 receives a frame descriptor 126, DMA engine 114 creates a working frame descriptor 128 based on information in the frame descriptor 126. If no changes are made to frame 130, frame descriptor 126 and working frame descriptor 128 contain the same information. When task 118 makes changes to frame 130, working frame descriptor 128 is used to record changes and present a coherent view of the modified working frame 129. Working frame 129 can be used to store information that is intended to be written to frame 130 once changes are accepted and the task 118 making the changes closes the frame 130. Working frame descriptor 128 thus can refer to segments within working frame 129 along with segments in frame 130 when changes are being made to frame 130. Once a task 118 is finished modifying frame 130, information in working frame 129 can add to or replace information in frame 130 so that frame 130 matches the representation of frame 130 in working frame descriptor 128. Frame descriptor 126 can also be updated to match the information in working frame descriptor 128 so accurate reference to segments in frame 130 can be made in subsequent processing. Note that more than one working frame descriptor 128, working frame 129, and frame 130 can be associated with a particular task 118.

In the example shown in FIG. 4, working frame descriptor 128 includes container descriptor 302 that points to an address of or pointer to a beginning of frame 130 and string descriptor 302 that indicates an offset into frame 130 to the beginning of byte string 305 and length or number of bytes in byte string 305. Byte string 305 is shown as including 160 contiguous bytes, however any other suitable number of bytes can be included in byte string 305.

Figure 5:
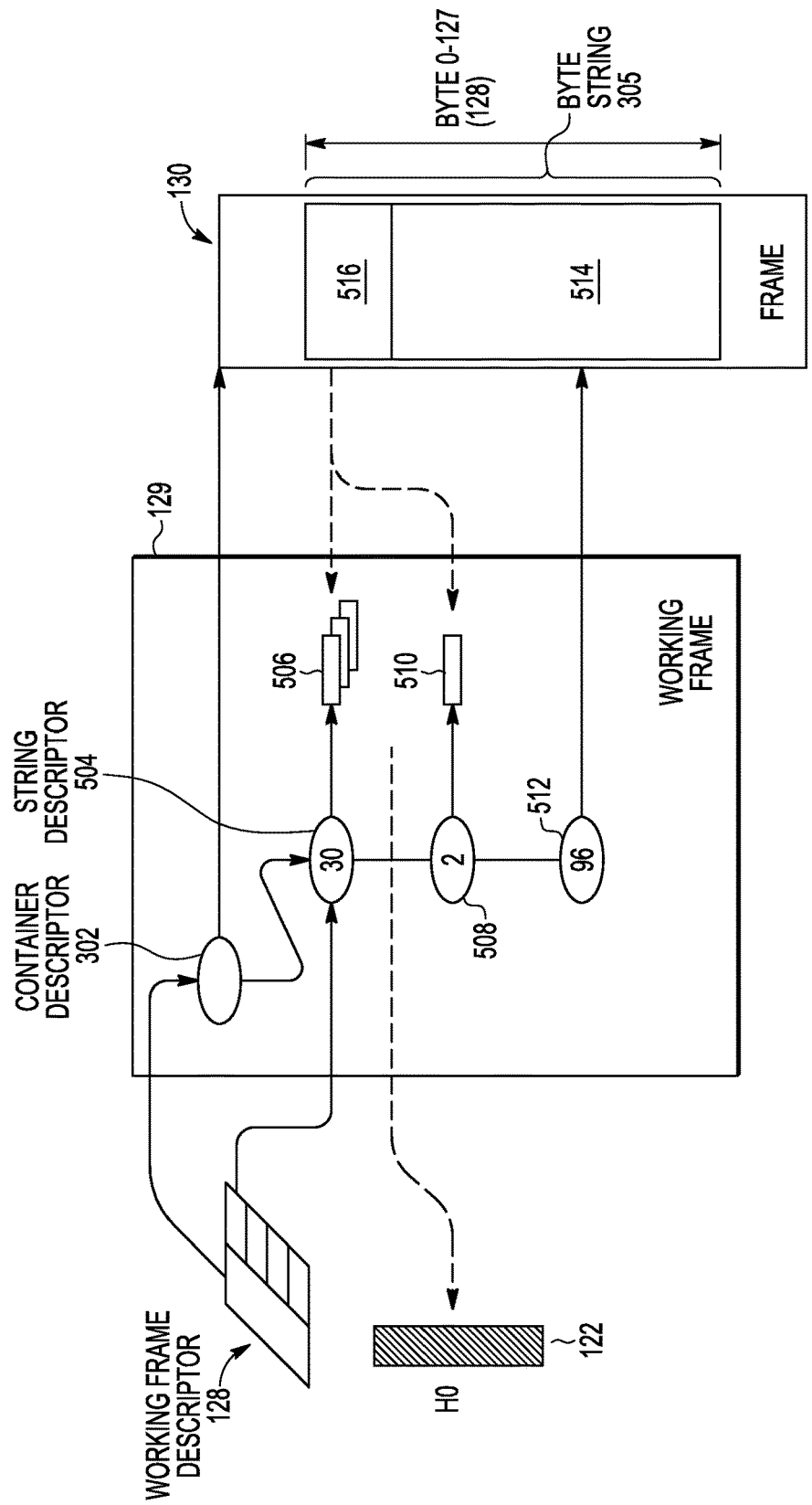

Referring to FIGS. 1 and 5, FIG. 5 illustrates working frame descriptor 128, working frame 129, and frame 130 after task 118 has issued an open and present instruction for a segment of the first 30 bytes from byte string 305. Frame 130 includes byte string 305 that includes 128 bytes. Since DMA engine 114 is configured to read an optimally efficient minimum number of bytes at a time, such as for example, 32 bytes per read operation, DMA engine 114 retrieves the prespecified number of bytes, in this case 32 bytes 516, from the start of frame 130 into working frame 129. Working frame descriptor 128 is created in DMA engine 114 with container descriptor 302 pointing to the start of frame 130 along with string descriptors 504, 508, 512. String descriptor 504 specifies the first 30 bytes from the start of byte string 305 as a first internal string 506 in working frame 129. String descriptor 508 points to a second internal string 510 in working frame 129 that includes the remaining 2 bytes from the read operation of the first 32 bytes 516 from byte string 305. String descriptor 512 points to the remaining 96 bytes 514 in byte string 305 of frame 130. The 30 bytes of data in internal string 506 of working frame 129 is transferred to workspace 122 in core 102 as one of presented segments 132-136 and is referred to using handle H0 in working frame descriptor 128.

Figure 6:
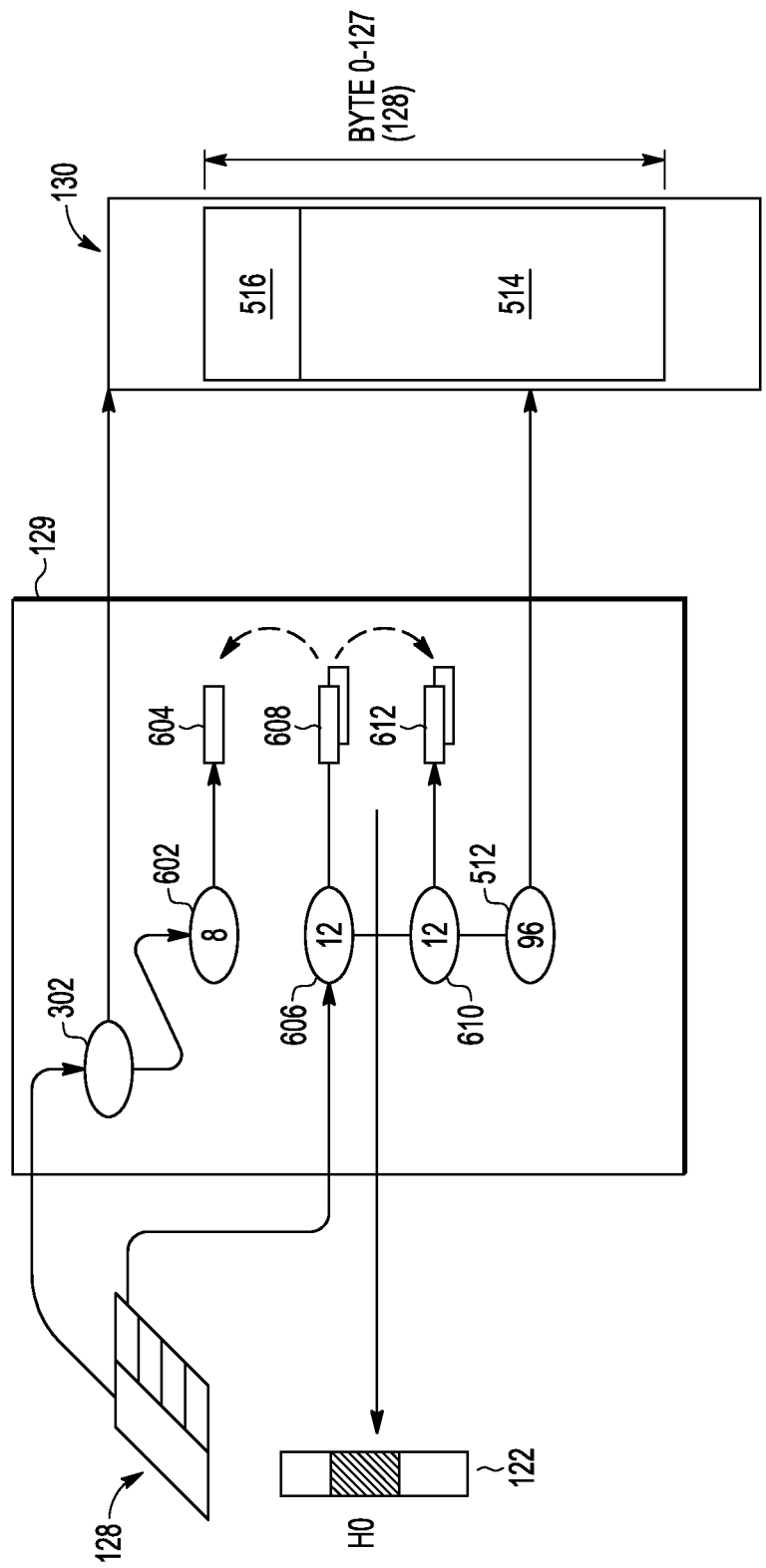

Referring to FIGS. 1 and 6, subsequent to the open and present operations illustrated in FIG. 5, FIG. 6 illustrates working frame descriptor 128, working frame 129, and frame 130 after task 118 has issued a trim segment instruction to remove the first 8 bytes and the last 10 bytes from the first 30 bytes 516 from byte string 305. Working frame descriptor 128 in DMA engine 114 still includes container descriptor 302 pointing to the start of frame 130, but a new set of string descriptors 602, 606, 610 are created to replace string descriptors 504 and 508 (FIG. 5). String descriptor 602 specifies the first 8 bytes from the start of byte string 305 are transferred to an adjacent segment in internal string 604 in working frame 129. String descriptor 606 is still referred to by task 118 using handle H0 that points to a second internal string 608 in working frame 129 that includes the 12 bytes that are to remain as part of the presented segment 132, 134 or 136 in workspace 122. String descriptor 610 points to the last 10 bytes that are trimmed from the initial 30 bytes 504 (FIG. 5) combined with 2 bytes from string descriptor 508 and placed in internal string 612 that is adjacent to internal string 608. String descriptor 512 still points to the remaining 96 bytes 514 in byte string 305 of frame 130. One of presented segments 132-136 of workspace 122 includes the data in internal string 608 stored in working frame 129.

Figure 7:
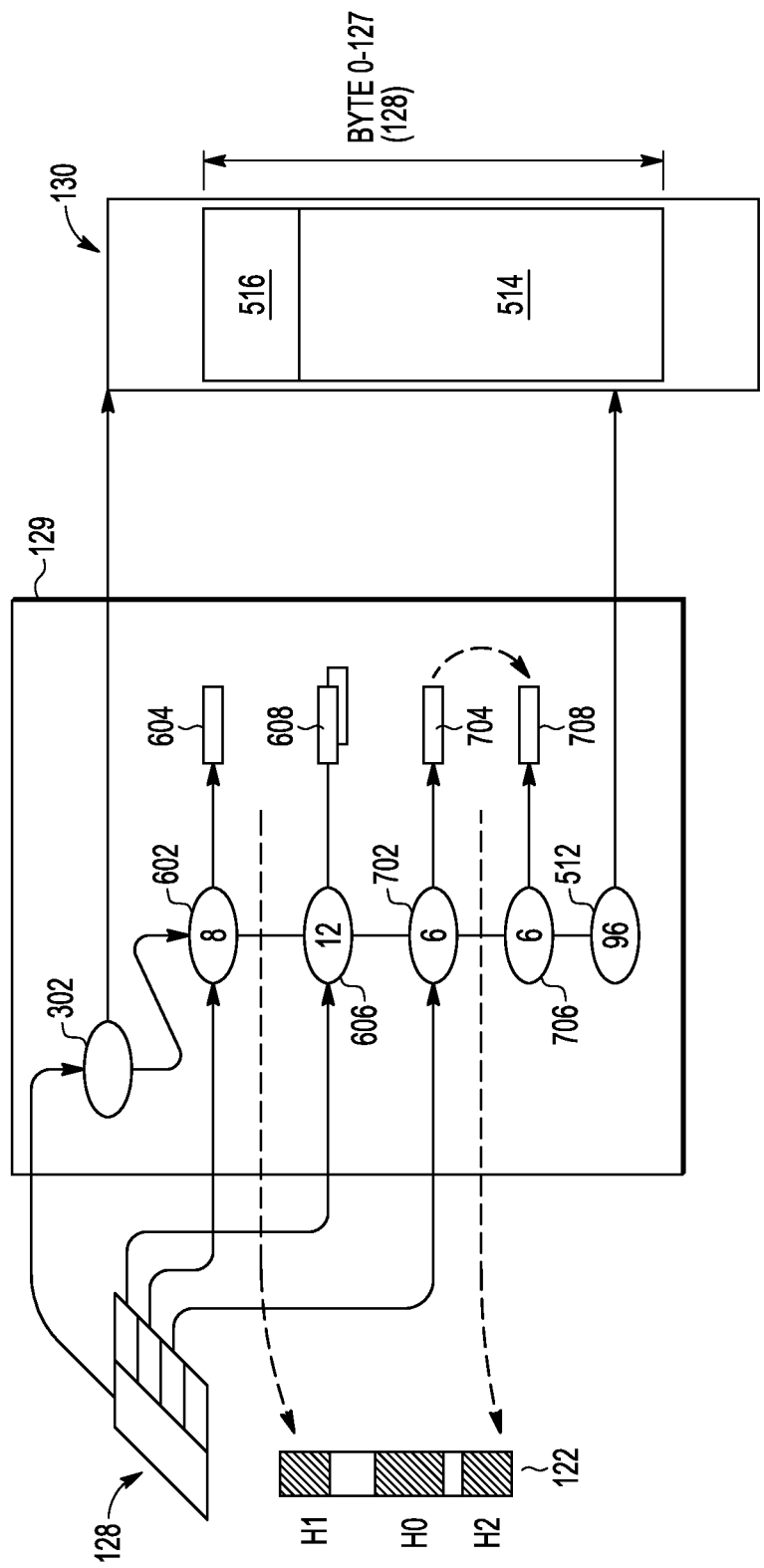

Referring to FIGS. 1 and 7, subsequent to the trim operations illustrated in FIG. 6, FIG. 7 illustrates working frame descriptor 128, working frame 129, and frame 130 after task 118 has issued a first define segment instruction to assign a handle (shown as handle H1) in working frame descriptor 128 for the 8 bytes in internal segment 604, and a second define segment instruction to assign another handle (shown as handle H2) in working frame descriptor 128 for the first 6 bytes in internal segment 612 (FIG. 6). Working frame descriptor 128 in DMA engine 114 still includes container descriptor 302 pointing to the start of frame 130, string descriptor 602 pointing to internal string 604, string descriptor 606 pointing to internal string 608 and string descriptor 512 pointing to the last 96 bytes 514 in byte string 516. Handle H0 is still assigned to the 12 bytes in internal string 608 and in workspace 122. New string descriptors 702 and 706 are created to replace string descriptor 610 (FIG. 6). String descriptor 702 points to internal string 704 containing the first 6 bytes from previous internal string 612 (FIG. 6). String descriptor 706 points to internal string 708 containing the remaining 6 bytes from previous internal string 612 (FIG. 6). String descriptor 512 still points to the remaining 96 bytes 514 in byte string 305 of frame 130. A first one of presented segments 132-136 of workspace 122 includes the data in internal string 604 stored in working frame 129. A second one of presented segments 132-136 of workspace 122 includes the data in internal string 608 stored in working frame 129. A third one of presented segments 132-136 of workspace 122 includes the data in internal string 704 stored in working frame 129.

Figure 8:
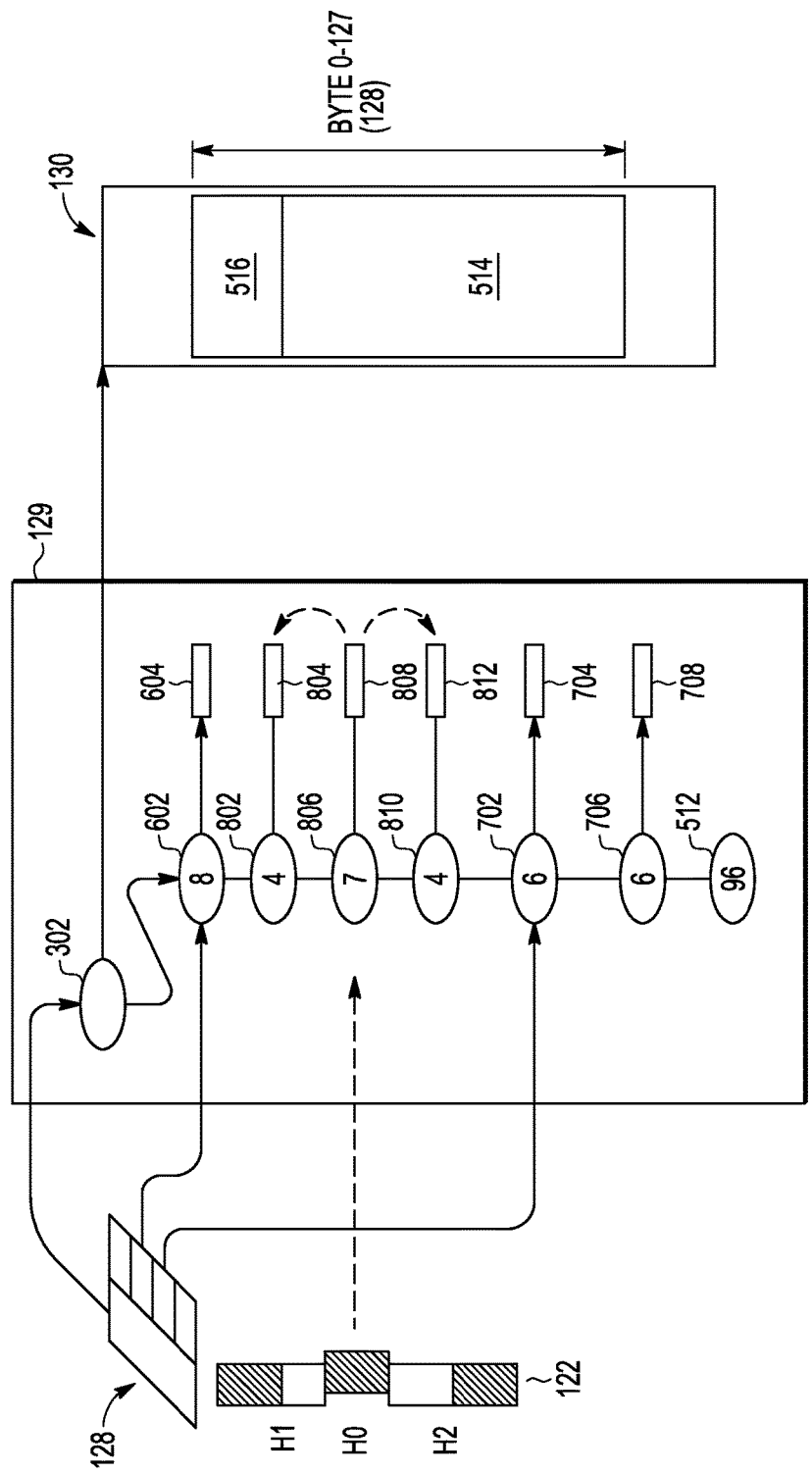

Referring to FIGS. 1 and 8, subsequent to the define segment operations illustrated in FIG. 7, FIG. 8 illustrates working frame descriptor 128, working frame 129, and frame 130 after task 118 has issued a replace segment instruction to replace 4 bytes of data in the middle of internal segment 608, referenced by Handle H0, (FIG. 7) with 7 bytes of data. The first 4 bytes and last 4 bytes of internal segment 608 will remain unmodified. After the replace segment instruction is performed, working frame descriptor 128 in DMA engine 114 still includes container descriptor 302 pointing to the start of frame 130, string descriptor 602 pointing to internal string 604, string descriptor 702 pointing to internal string 704 and string descriptor 512 pointing to the last 96 bytes 514 in byte string 516. New string descriptors 802, 806 and 810 are created to replace string descriptor 606 (FIG. 7). String descriptor 802 points to internal string 804 containing the first 4 bytes from previous internal string 608 (FIG. 7). String descriptor 806 points to internal string 808 containing 7 bytes that replace the middle 4 bytes from previous internal string 608. String descriptor 810 points to internal string 812 containing the remaining 4 bytes from previous internal string 608. Handle H0 is assigned to the 7 bytes in internal string 808 and in workspace 122. Handle H1 is assigned to internal segment 604. Handle H2 is assigned to internal string 708. A first one of presented segments 132-136 of workspace 122 includes the data in internal string 808 stored in working frame 129. A second one of presented segments 132-136 of workspace 122 includes the data in internal string 604 stored in working frame 129. A third one of presented segments 132-136 of workspace 122 includes the data in internal string 704 stored in working frame 129.

The changes in working frame 129 and working frame descriptor 128 are transferred to frame 130 and frame descriptor 126, respectively, when task 118 closes frame 130. The working frame descriptor 128 and working frame 129 are then cleared and released for use by another task 118.

Figure 9:
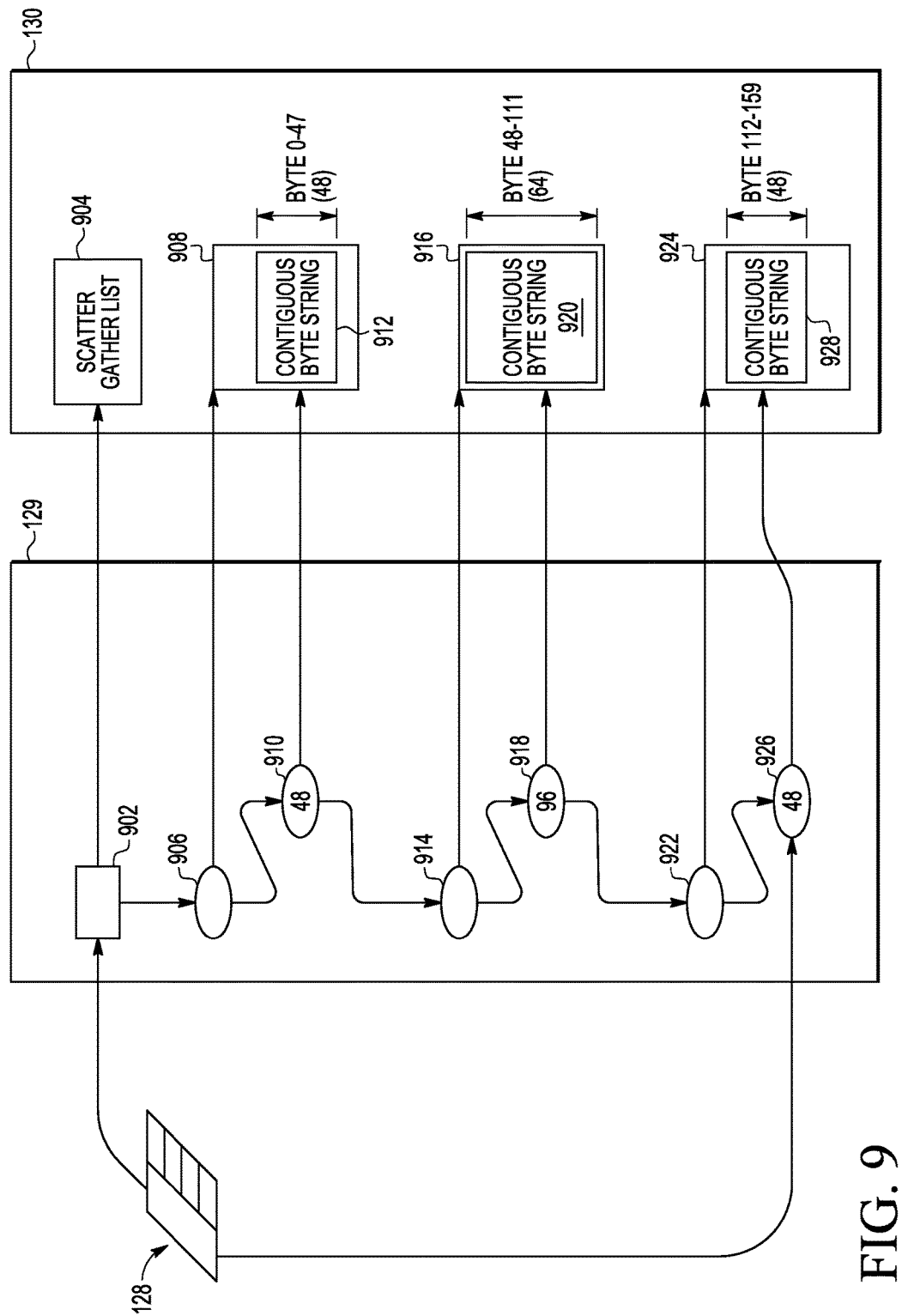
Figure 10:
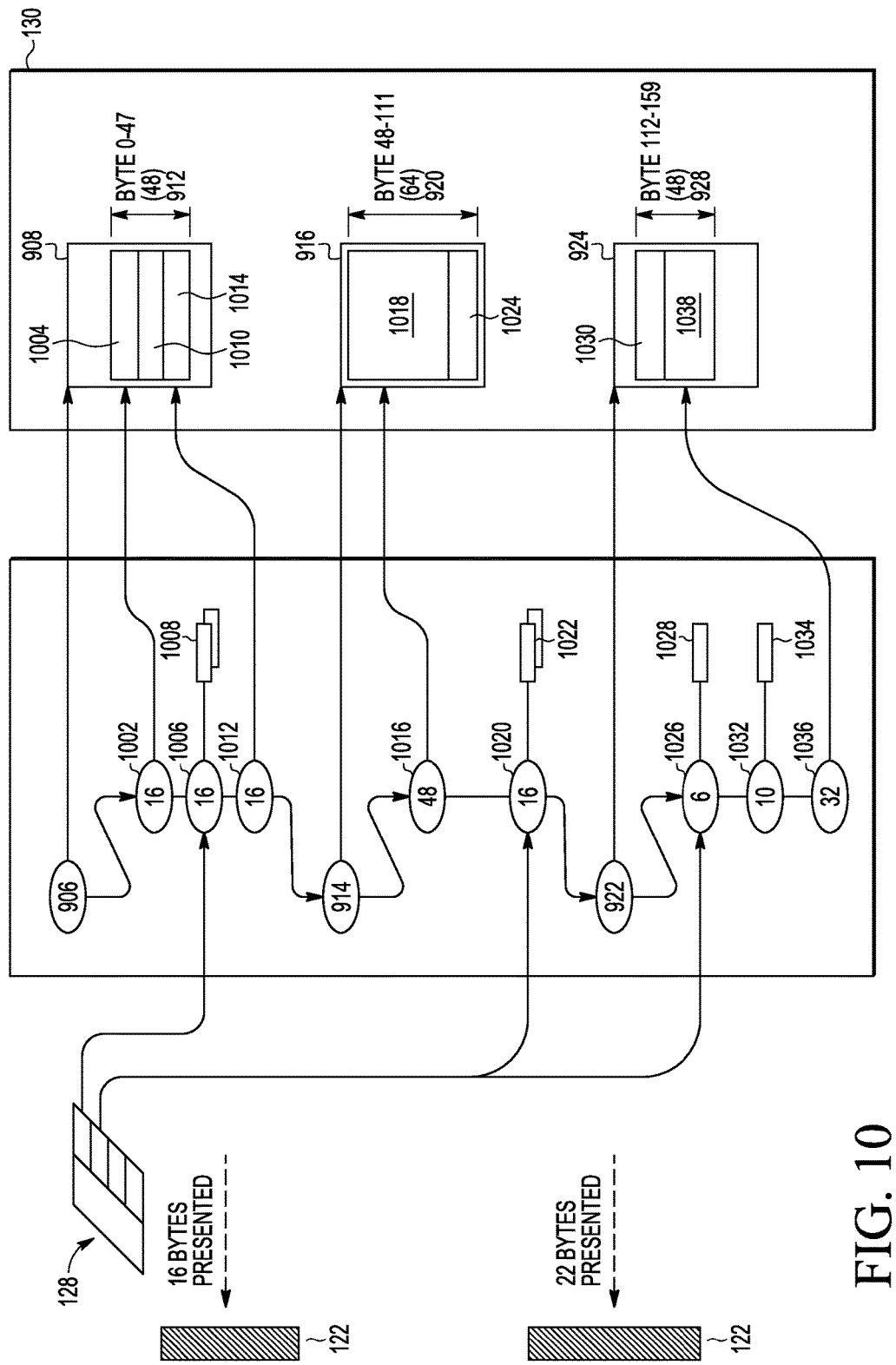
Figure 11:
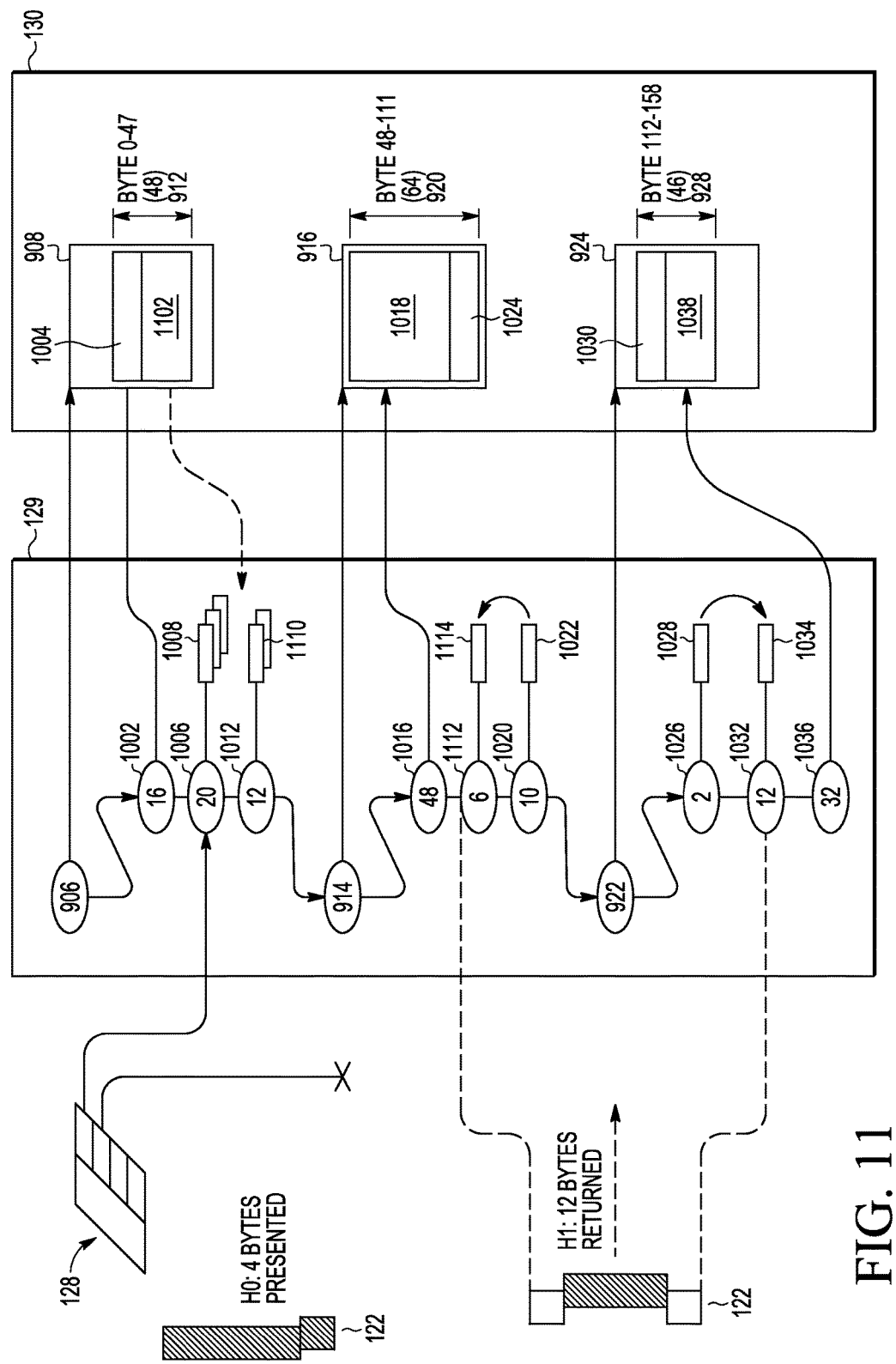

While the previous examples of FIGS. 4-8 pertain to frame 130 with a single buffer, FIGS. 9-11 pertain to frame 130 with multiple buffers. As shown in FIG. 9, initially DMA engine 114 converts frame descriptor 126, or where applicable a frame descriptor 126 and a scatter gather list 904, to working frame descriptor 128. Scatter gather list 904 specifies an array of scatter/gather elements that include an address and length of each buffer 908, 916, 924 that are included in frame 130. When a scatter gather list 904 is used, working frame descriptor 128 includes a pointer 902 to scatter gather list 904, which provides the address and length of buffers 908, 916, 924. Working frame descriptor 128 will thus include container descriptors 906, 914, 922 and string descriptors 910, 918, 926 for corresponding byte strings 912, 920, 928 in respective buffers 908, 916, 924 based on information in scatter gather list 904. While container descriptors 906, 914, 922 point to the address or location of respective buffers 908, 916, 924, string descriptors 910, 918, 926 include information regarding the offset and length of byte strings 912, 920, 928 within buffers 908, 916, 924.

In the example shown in FIG. 9, frame 130 includes a 48 byte string 912 in buffer 908, a 64 byte string 920 in buffer 916, and a 48 byte string 928 in buffer 924. Other examples can include a different number of buffers and a different number of bytes in each buffer.

Referring to FIGS. 1 and 10, FIG. 10 illustrates working frame descriptor 128, working frame 129, and frame 130 after a first open and present instruction has been performed for a segment of 16 bytes from buffer 908 with an offset of 16 bytes from the start of byte string 912, and a second open and present instruction has been performed for a segment of 22 bytes from the end of byte string 920 and the start of byte string 928 with an offset of 96 bytes from the start of byte string 920. Byte string 912 includes 48 bytes, byte string 920 includes 64 bytes, and byte string 928 includes 48 bytes.

With regard to the first open and present instruction, since DMA engine 114 is configured to read an optimally efficient minimum number of bytes at a time, such as for example, 32 bytes per read operation, DMA engine 114 retrieves the prespecified number of bytes, in this case 32 bytes 1010 offset by 16 bytes 1004 from the start of byte string 912 into internal string 1008 in working frame 129. Working frame descriptor 128 is created in DMA engine 114 with container descriptor 906 pointing to the start of buffer 908 along with string descriptors 1002, 1006, 1012. String descriptor 1002 specifies the first 16 bytes 1004 from the start of buffer 908 that remain in an external string 1004 in frame 130 because the first 16 bytes 1004 were not requested by the first open and present instruction. String descriptor 1006 points to an internal string 1008 in working frame 129 that includes the first 16 byte string 1010 that were requested from buffer 912 by the first open and present instruction. String descriptor 1012 points to a residue 16 byte string 1014 in buffer 908 of frame 130 that remains as an external string because residue 16 byte string 1014 was not request by the open and present instruction. No adjacent internal residue string is required as in the example in FIG. 5 since the requested segment aligned with the end of a system memory 32 byte address-aligned block.

With regard to the second open and present instruction, DMA engine 114 retrieves the prespecified number of bytes, in this case 16 bytes 1024 offset by 96 bytes from the start of byte string 912 into working frame 129. Working frame descriptor 128 is created in DMA engine 114 with container descriptor 914 pointing to the start of buffer 916 along with string descriptors 1016 and 1020. String descriptor 1016 specifies the first 48 bytes 1018 from the start of byte string 920 that remain in an external string in buffer 920 because the first 48 bytes 1018 were not requested by the second open and present instruction. String descriptor 1020 points to an internal string 1022 in working frame 129 that includes the first 16 byte string 1024 from byte string 920. Since 22 bytes were requested by the second open and present instruction, the remaining 6 bytes 1030 are taken from the beginning of buffer 924 or byte string 928. String descriptor 1026 points to internal string 1028, which contains a copy of the remaining 6 bytes 1030. Since 32 bytes were read while performing the second open and present instruction, but only 22 bytes were requested, a copy of the remaining 10 bytes read by the second open and present instruction are stored in internal string 1034, which is adjacent to internal string 1028 in working frame 129. String descriptor 1036 is created to point to byte string 1038 in buffer 928 where the remaining 32 bytes remain in frame 130 in external memory 116.

The 16 bytes stored in internal string 1008, and the 22 bytes stored in internal strings 1022, 1028 in working frame 129 are copied to a respective one of presented segments 132-136 in workspace 122. Segment handle H0 128 is assigned to internal string 1008 and segment handle H1 is assigned to the combination of internal strings 1022 and 1028.

Referring to FIGS. 1 and 11, FIG. 11 illustrates working frame descriptor 128, working frame 129, and frame 130 after expand segment and present instructions have been performed on handle H0, and after trim, replace, and close instructions have been performed on handle H1.

With regard to the expand segment and present instructions performed on handle H0, internal segment 1008 is expanded to include 4 bytes from external segment 1014 (FIG. 10). String descriptor 1006 now shows a length of 20 bytes for internal string 1008 and external strings 1010 and 1014 are combined into external string 1102. String descriptor 1012 now shows a length of 12 bytes for newly created internal string 1110, which holds the trailing residue of reading 16 bytes from external string 1014.

With regard to the trim, replace, and close instructions performed on handle H1, the trim instruction removes 6 bytes from the start of internal string 1022 and creates internal string 1114 adjacent to internal string 1022 to store the trimmed 6 bytes. Internal string 1022 now includes 10 bytes instead of 16 bytes since 6 bytes were trimmed, and string descriptor 1020 is updated to reflect the change. The replace instruction replaces 14 bytes with 12 bytes for handle H1. So, the 10 bytes in internal string 1022 and 4 bytes of internal string 1028 are replaced, leaving 2 bytes left in internal string 1028. Internal string 1034 now includes 2 bytes left from previous internal string 1028, bringing the total number of bytes in internal string 1034 to 12 bytes.

The changes in working frame 129 and working frame descriptors 128 are transferred to frame 130 and frame descriptor 126, respectively, when task 118 closes working frame 129. The working frame descriptor 128 is then cleared and released for use by another task 118.

By now it should be appreciated that embodiments of systems and methods have been described whereby a frame being processed by a task 118 is presented as a contiguous string of bytes, abstracting the underlying storage container. This abstracted view is called the working frame 129. Byte strings or segments of the working frame 129 can be presented, modified, re-sized, and then committed back to the working frame with no knowledge or limitations imposed by the external memory 116 where frame 130 is stored. The working frame 129 is stored in near memory (low access latency) providing fast access to frame data to the task 118. Multiple non-overlapping frame segments can be presented concurrently and independently in presented segments 132-136, enabling software to be developed in a modular way and view the frame segments as objects. At all times, a stateful representation of the working frame 129 and the modifications applied to it is maintained. One or more frame segments can be used to represent the working frame 129. Once a task decides to forward the frame 130, the working frame 129 can then be stored as frame 130 into the original location in external memory 116 with some additional buffering resources added, or into a new container of a specified format.

In some embodiments, in a data processing system (100) having a first module (102), a queue manager (108), a system memory (116) external to the first module, and a memory access engine (114), a method can comprise executing a task (118) within the first module which requires access to a frame (130) stored within the system memory. The frame can includes one or more contiguous portions, and the queue manager can store a frame descriptor (126) identifying the frame. In response to receiving the frame descriptor from the queue manager, the memory access engine can create a working frame descriptor (128) using the frame descriptor, and store the working frame descriptor in storage circuitry of the memory access engine. The working frame descriptor can identify a location of each contiguous portion of the frame in system memory. During execution of the task, access to a first segment of the frame can be requested. In response to the requesting access to the first segment, the memory access engine can copy the requested first segment (e.g. presented segment 518) of the frame from system memory to a workspace (122) of the first module and create a first segment handle in the working frame descriptor to identify the requested first segment in the workspace. The requested first segment in the workspace can be modified. After modifying the requested first segment in the workspace, the memory access engine can update the frame in the system memory using the first segment handle and the modified requested first segment.

In another aspect, in response to the requesting access to the first segment, the method can further comprise copying, by the memory access engine, an additional portion (e.g. over-read data) of the frame adjacent to the first segment from system memory into a working frame (510) stored within the memory access engine.

In another aspect, copying the additional portion of the frame into the working frame comprises performing a memory aligned read from the system memory.

In another aspect, modifying the requested first segment in the workspace can comprise trimming a trim portion (e.g. 604) from the requested first segment in the workspace to create a trimmed segment.

In another aspect, trimming the trim portion from the requested first segment in the workspace can comprise separating the trim portion into a second segment (e.g. 604 in FIG. 6) of a working frame stored within the memory access engine; and updating the first segment handle (e.g. handle to 606) to identify the trimmed segment.

In another aspect, updating the frame in system memory using the first segment handle and the modified requested first segment can comprise storing, by the memory access engine, the trimmed segment identified by the first segment handle to the system memory. The second segment of the working frame stored within the memory access engine is not written to the system memory.

In another aspect, separating the trim portion into a second segment of a working frame within the memory access engine can comprise merging the second segment with a third segment of the working frame (e.g. merge with 612 in FIG. 6). The third segment can correspond to an unmodified segment of the frame.

In another aspect, modifying the requested first segment in the workspace can comprise replacing a portion of the requested first segment with a data portion (e.g. 808) that is different in size than the replaced portion.

In another aspect, replacing the portion of the requested first segment can comprise separating a non-replaced portion of the requested first segment into a second segment (e.g. 804 or 812) of a working frame stored within the memory access engine; and updating the first segment handle to identify the data portion.

In another aspect, updating the frame in system memory using the first segment handle and the modified requested first segment can comprise storing, by the memory access engine, the data portion identified by the first segment handle to the system memory. The second segment of the working frame stored within the memory access engine is not written to the system memory.

In another aspect, modifying the requested first segment in the workspace can comprise during execution of the task, requesting access to additional data adjacent the first segment of the frame. In response to requesting access to the additional data, the memory access engine can copy a second segment of the first frame which includes the additional data from the system memory to the workspace. The first segment handle can be updated to identify the requested first segment extended with the additional data in the workspace.

In another aspect, the first segment (e.g. 1022, 1028) of the frame spans across a plurality of contiguous portions of the frame in system memory. Creating the first segment handle in the working frame to identify the requested first segment is performed such that the first segment handle (e.g. arrows to 1020 and 1026) identifies both a first portion of the requested first segment within a first contiguous portion of the frame and a second portion of the requested first segment within the first contiguous portion of the frame.

In another aspect, the working frame descriptor can identify a location of each contiguous portion of the frame system memory by indicating a memory container, offset, and size of each contiguous portion. (e.g. 602, 606, 610).

In another embodiment, a data processing system can comprise a first module having a workspace and configured to execute a task that can request access to a frame in a system memory, a queue manager configured to store a frame descriptor which identifies the frame in the system memory, and a memory access engine coupled to the first module and the queue manager. The memory access engine copies requested segments of the frame to the workspace of the first module and has a working frame unit to store a segment handle identifying a location and size of each requested segment copied to the workspace of the first module. The memory access engine tracks history of a requested segment by updating the working frame unit when the requested segment in the workspace is modified by the executing task.

In another aspect, the memory access engine can be configured to track history of a requested segment by updating the segment handle corresponding to the requested segment when the requested segment is modified due to a trim operation, extend operation, or replacement operation.

In another aspect, the working frame unit can be configured to, in response to the trim operation, create a second segment within the memory access engine corresponding to a trimmed portion from the requested segment wherein the trimmed portion is no longer included in the requested segment identified by the corresponding segment handle.

In another aspect, the working frame unit can be configured to, in response to the replacement operation, create a second segment within the memory access engine corresponding to a non-replaced portion of the requested segment. The non-replaced portion may no longer included in the requested segment identified by the corresponding segment handle.

In another aspect, the memory access engine can be further configured to copy additional segments from the frame in the system memory to the working frame unit, and the working frame unit is further configured to identify the additional segments. The additional segments reside in the working frame unit and are not copied to the workspace until requested by the task.

In another aspect, the memory access engine can be configured to, in response to an additional segment being requested by the task, copy the additional segment from the working frame unit to the workspace, and the working handle unit can be configured to create a second segment handle to identify the location and size of the additional segment and track history of the additional segment in the workspace.

In another aspect, the memory access unit can be further configured to update the frame in system memory. The memory access unit can be configured to update the frame only with the requested segments that are indicated as modified by the work frame unit.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

The term "thread", "task" or "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. Also for example, system 100 or portions thereof may be soft or code representations of physical circuitry or of logical representations convertible into physical circuitry. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In some embodiments, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a first processing core, a queue manager, a system memory external to the first processing core, and a memory access engine, a method comprising:
   executing a task within the first processing core which requires access to a frame stored within the system memory, wherein the frame includes one or more contiguous portions, and wherein the queue manager stores a frame descriptor identifying the frame;
   in response to receiving the frame descriptor from the queue manager, creating, by the memory access engine, a working frame descriptor using the frame descriptor, and storing the working frame descriptor in storage circuitry of the memory access engine, wherein the working frame descriptor identifies a location of each contiguous portion of the frame in the system memory;
   during execution of the task, requesting access to a first segment of the frame;
   in response to the requesting access to the first segment, copying, by the memory access engine, the requested first segment of the frame from the system memory to a workspace of the first processing core and creating a first segment handle in the working frame descriptor to identify the requested first segment in the workspace;
   modifying the requested first segment in the workspace; and
   after the modifying the requested first segment in the workspace, updating, by the memory access engine, the frame in the system memory using the first segment handle and the modified requested first segment.

2. The method of claim 1, wherein in response to the requesting access to the first segment, the method further comprises:
   copying, by the memory access engine, an additional portion of the frame adjacent to the first segment from the system memory into a working frame stored within the memory access engine.

3. The method of claim 2, wherein copying the additional portion of the frame into the working frame comprises performing a memory aligned read from the system memory.

4. The method of claim 1, wherein the modifying the requested first segment in the workspace comprises:
   trimming a trim portion from the requested first segment in the workspace to create a trimmed segment.

5. The method of claim 4, wherein the trimming the trim portion from the requested first segment in the workspace comprises:
   separating the trim portion into a second segment of a working frame stored within the memory access engine; and
   updating the first segment handle to identify the trimmed segment.

6. The method of claim 5, wherein the updating the frame in the system memory using the first segment handle and the modified requested first segment comprises:
   storing, by the memory access engine, the trimmed segment identified by the first segment handle to the system memory, wherein the second segment of the working frame stored within the memory access engine is not written to the system memory.

7. The method of claim 5, wherein the separating the trim portion into the second segment of a working frame within the memory access engine comprises:
   merging the second segment with a third segment of the working frame, wherein the third segment corresponds to an unmodified segment of the frame.

8. The method of claim 1, wherein the modifying the requested first segment in the workspace comprises:
   replacing a portion of the requested first segment with a data portion that is different in size than the replaced portion.

9. The method of claim 8, wherein the replacing the portion of the requested first segment comprises:

separating a non-replaced portion of the requested first segment into a second segment of a working frame stored within the memory access engine; and updating the first segment handle to identify the data portion.

10. The method of claim 9, wherein the updating the frame in the system memory using the first segment handle and the modified requested first segment comprises:

storing, by the memory access engine, the data portion identified by the first segment handle to the system memory, wherein the second segment of the working frame stored within the memory access engine is not written to the system memory.

11. The method of claim 1, wherein the modifying the requested first segment in the workspace comprises:

during execution of the task, requesting access to additional data adjacent the first segment of the frame;

in response to the requesting access to the additional data, copying, by the memory access engine, a second segment of the frame which includes the additional data from the system memory to the workspace; and updating the first segment handle to identify the requested first segment extended with the additional data in the workspace.

12. The method of claim 11, wherein the first segment of the frame spans across a plurality of contiguous portions of the frame in the system memory, and wherein the creating of the first segment handle in a working frame to identify the requested first segment is performed such that the first segment handle identifies both a first portion of the requested first segment within a first contiguous portion of the frame and a second portion of the requested first segment within a second contiguous portion of the frame.

13. The method of claim 1, wherein the working frame descriptor identifies a location of each contiguous portion of the frame in the system memory by indicating a memory container, offset, and size of each contiguous portion.

14. A data processing system comprising:

a first processing core having a workspace and configured to execute a task, wherein the task requests access to a frame in a system memory;

a queue manager circuit configured to store a frame descriptor which identifies the frame in the system memory; and a memory access engine coupled to the first processing core and the queue manager, the memory access engine configured to copy requested segments of the frame from the system memory to the workspace of the first processing core and having a working frame descriptor configured to store a segment handle identifying a location and size of each requested segment copied to the workspace of the first processing core, wherein the memory access engine is configured to:

track history of a requested segment by updating the working frame descriptor, and update the frame in the system memory, when the requested segment in the workspace is modified by the executing task in the first processing core.

15. The data processing system of claim 14, wherein the memory access engine is configured to track a history of the requested segment by updating the segment handle corresponding to the requested segment when the requested segment is modified due to a trim operation, extend operation, or replacement operation.

16. The data processing system of claim 15, wherein in response to the trim operation, a second segment is created within the memory access engine corresponding to a trimmed portion from the requested segment wherein the trimmed portion is no longer included in the requested segment identified by the segment handle corresponding to the requested segment.

17. The data processing system of claim 15, wherein, in response to the replacement operation, a second segment is created within the memory access engine corresponding to a non-replaced portion of the requested segment, wherein the non-replaced portion is no longer included in the requested segment identified by the segment handle corresponding to the requested segment.

18. The data processing system of claim 14, wherein the memory access engine is further configured to copy additional segments from the frame in the system memory to a working frame, and to identify the additional segments, wherein the additional segments reside in the working frame and are not copied to the workspace until requested by the task.

19. The data processing system of claim 18, wherein the memory access engine is configured to, in response to an additional segment being requested by the task, copy the additional segment from the working frame to the workspace, and to create a second segment handle to identify the location and size of the additional segment and track history of the additional segment in the workspace.

20. The data processing system of claim 18, wherein the memory access engine is further configured to update the frame in the system memory, wherein the frame is updated only with the requested segments that are indicated as modified by the working frame.

* * * * *